United States Patent
Kong et al.

(10) Patent No.: US 8,711,102 B2
(45) Date of Patent: Apr. 29, 2014

(54) GRAPHICAL COMMUNICATION USER INTERFACE WITH GRAPHICAL POSITION USER INPUT MECHANISM FOR SELECTING A DISPLAY IMAGE

(75) Inventors: Randy Yuan Kong, Kirkland, WA (US); Chunhui Zhang, Beijing (CN); Qiong Yang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1379 days.

(21) Appl. No.: 11/818,919

(22) Filed: Jun. 15, 2007

(65) Prior Publication Data

US 2008/0309617 A1 Dec. 18, 2008

(51) Int. Cl.
*G06F 3/041* (2006.01)
*G06K 9/46* (2006.01)

(52) U.S. Cl.
USPC .......................................... 345/173; 382/190

(58) Field of Classification Search
None
See application file for complete search history.

(56) References Cited

U.S. PATENT DOCUMENTS

| | | | | |
|---|---|---|---|---|
| 5,793,365 A * | 8/1998 | Tang et al. | ..................... | 715/758 |
| 5,821,922 A * | 10/1998 | Sellers | ........................... | 345/157 |
| 5,917,470 A * | 6/1999 | Fujioka | ......................... | 345/660 |
| 6,310,610 B1 | 10/2001 | Beaton et al. | ................ | 345/173 |
| 6,344,861 B1 | 2/2002 | Naughton et al. | ........... | 345/769 |
| 6,366,782 B1 | 4/2002 | Fumarolo et al. | ............ | 455/457 |
| 6,714,222 B1 | 3/2004 | Bjorn et al. | ................... | 345/839 |
| 6,847,383 B2 * | 1/2005 | Agnew | .......................... | 345/660 |
| 7,246,371 B2 * | 7/2007 | Diacakis et al. | .................. | 726/2 |
| 7,509,588 B2 * | 3/2009 | Van Os et al. | ................ | 715/835 |
| 7,620,404 B2 * | 11/2009 | Chesnais et al. | ........... | 455/456.1 |
| 8,014,760 B2 * | 9/2011 | Forstall et al. | ............. | 455/412.2 |
| 8,106,856 B2 * | 1/2012 | Matas et al. | ..................... | 345/73 |
| 8,130,205 B2 * | 3/2012 | Forstall et al. | ................ | 345/173 |
| 2002/0058536 A1* | 5/2002 | Horii et al. | ..................... | 455/566 |
| 2003/0059033 A1* | 3/2003 | Wall et al. | ............... | 379/355.01 |
| 2004/0196267 A1* | 10/2004 | Kawai et al. | ................... | 345/173 |
| 2004/0235520 A1* | 11/2004 | Cadiz et al. | .................. | 455/557 |
| 2004/0250217 A1* | 12/2004 | Tojo et al. | ..................... | 715/810 |
| 2005/0044143 A1* | 2/2005 | Zimmermann et al. | ...... | 709/204 |
| 2005/0091272 A1* | 4/2005 | Smith et al. | ................ | 707/104.1 |
| 2005/0130678 A1* | 6/2005 | Jendbro et al. | ............. | 455/456.6 |
| 2006/0120308 A1 | 6/2006 | Forbes et al. | ................. | 370/260 |
| 2006/0177110 A1* | 8/2006 | Imagawa et al. | .............. | 382/118 |
| 2007/0002777 A1 | 1/2007 | Morris et al. | ................. | 370/260 |
| 2007/0067295 A1 | 3/2007 | Parulski et al. | ................... | 707/7 |
| 2008/0220750 A1* | 9/2008 | Steinberg et al. | .......... | 455/414.1 |

OTHER PUBLICATIONS

Secant, http://www.housedesign.co.za/Developersecant.html, 2005, pp. 1-4.
iPhone, http:www.apple.com/iphone/phone/, 2007, 1 page.

* cited by examiner

*Primary Examiner* — Vijay Shankar
*Assistant Examiner* — Patrick F Marinelli
(74) *Attorney, Agent, or Firm* — Jeremy Snodgrass; Glen Johnson; Micky Minhas

(57) ABSTRACT

New devices, systems and methods are hereby provided that enable a user to open a communication channel by selecting an image on a monitor. A device that includes a monitor and a graphical position user input mechanism is configured to display one or more images on the monitor, to receive a graphical position user input selecting one of the images, and to open a communication channel directed to a contact information element associated with the selected image. For example, this may include placing a phone call to a selected recipient, or opening an email, instant messaging, or text message composition panel addressed to a selected recipient, by touching, clicking on, or otherwise selecting an image of the recipient, or an image that is associated with the recipient.

18 Claims, 7 Drawing Sheets

GRAPHICAL COMMUNICATION USER INTERFACE WITH GRAPHICAL POSITION USER INPUT MECHANISM FOR SELECTING A DISPLAY IMAGE

BACKGROUND

Opening a channel of contact with someone in current telephone and instant messaging is largely based on direct input of a phone number, a name, or a username, such as by pressing or typing on buttons for individual numbers and letters or by scrolling through and selecting from a list of contacts. Such methods are often not intuitive, requiring close attention to small buttons and/or a screen that is often also small, requiring multiple operational steps, and/or requiring memorization of numbers or usernames or browsing through a sometimes very long list of potential contacts. Browsing a contact list also requires a substantial amount of dedicated screen space and intensive user attention, which may be found inconvenient and non-intuitive by many users, and which may present an undesired requirement for space and an unaesthetic presence in a household environment. Another method for opening a channel of contact is with voice recognition, which sometimes interprets voice inputs inconsistently or suffers impaired performance in noisy environments.

The discussion above is merely provided for general background information and is not intended to be used as an aid in determining the scope of the claimed subject matter.

SUMMARY

New devices, systems and methods are hereby provided that enable a user to open a communication channel by selecting an image on a monitor. A device that includes a monitor and a graphical position user input mechanism is configured to display one or more images on the monitor, to receive a graphical position user input selecting one of the images, and to open a communication channel directed to a contact information element associated with the selected image. For example, this may include placing a phone call to a selected recipient, or opening an email, instant messaging, or text message composition panel addressed to a selected recipient, by touching, clicking on, or otherwise selecting an image of the recipient, or an image that is associated with the recipient.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
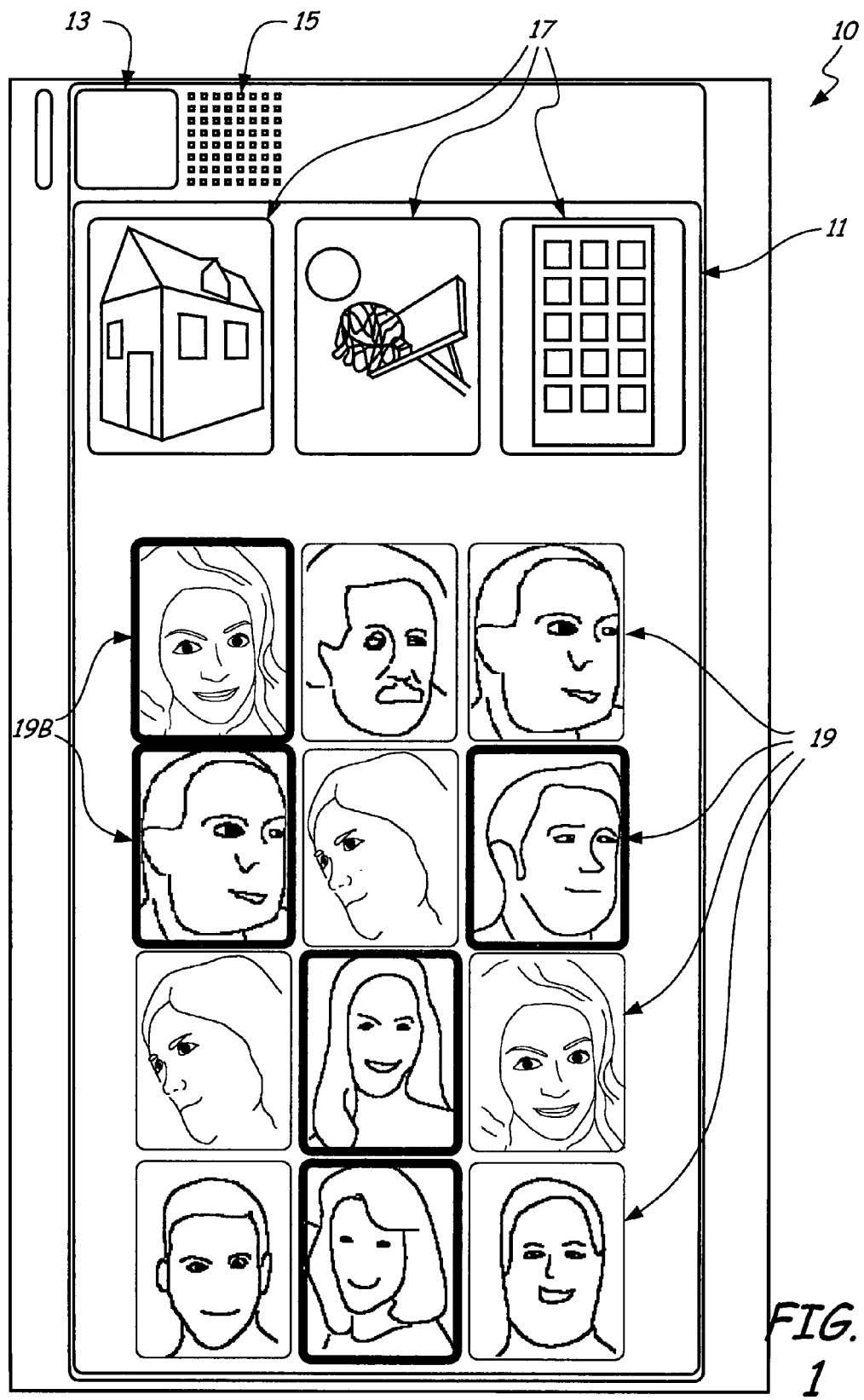
FIG. 1 depicts a device comprising a graphical communication user interface in an illustrative context of usage, according to an illustrative embodiment.

FIG. 1 depicts a communication device 10 comprising a graphical communication user interface, according to one illustrative embodiment. Computing device 10 includes monitor 11, camera 13, and microphone 15. In the depiction of FIG. 1, monitor 11 is displaying a few category icons 17, and several thumbnail contact images 19 of different contact people. Communication device 10 also includes a graphical position user input mechanism, such as a touchscreen, a tracking camera, or a pointing device, associated with the monitor. A pointing device may include a mouse, a touchpad, a pointing stick, a graphics tablet, a stylus, a trackball, a joystick, or a light pen, for example. Each of the category icons 17 and thumbnail contact images 19 is associated with a set of coordinates that may be indicated by a user input through the graphical position user input mechanism, so that a user can select one of the category icons 17 or thumbnail contact images 19 by touching them, i.e. by touching their positions on the monitor 11, in this illustrative embodiment.

Communication device 10 is configured to then respond to a user selection of one of category icons 17 or thumbnail contact images 19 by taking an appropriate action. Category icons 17 represent different groups of contacts who have been sorted by how the user knows them. They include an icon of a home to represent contacts who are family members and relatives; a basketball and basketball hoop to represent contacts who are personal friends; and an office building to represent contacts who are professional colleagues and acquaintances, in this illustrative embodiment. Any other types of categories may be defined and any other type of icons or other indicators may be used to represent them in other embodiments. User selection of one of category icons 17 may trigger the communication device 10 to display thumbnail contact images 19 of specific contacts belonging to the selected category. While FIG. 1 depicts direct images of the contact people, any other type of icon or other indicator may also be used for different contacts, such as a cartoon figure, a computer-generated avatar, or any other image or indicator.

Communication device 10 is configured to respond to a user selection of one of thumbnail contact images 19 by opening a communication channel to the contact person depicted in other otherwise indicated by the selected image. Communication device 10 is configured to do this in part by having a stored contact information element associated with each of the images. The contact information elements may be phone numbers, email addresses, instant messaging usernames, text message numbers, or other elements that identify a communication channel to a desired recipient. Communication device 10 is therefore configured so that when a user selects one of the thumbnail images 13, communication device 10 may place a phone call, or open an email, instant messaging, or text message composition panel addressed to a selected recipient. The user may then talk on the phone, or compose and send an email, instant message, or text message, for example, to the desired recipient. Which of these communication channels is used may have a default setting, or may have a default that is selected by the user. There may also be different input settings for either triggering the default communication channel or opening selectable options for what communication channel is desired. For example, communication device 10 may have a system default setting for a user selection of a contact image 19 to trigger placing a phone call to that contact's cellphone, for example, or to open additional communication channel options if the user so indicates, which may be by holding a finger on the contact image 19, or tapping a contact image 19 twice in rapid succession, or pressing a "display options" button prior to or while touching the contact image 19, or some other method. More about the selectable communication channels is depicted below, with reference to FIG. 4.

Contact images 19 may also be displayed in different modes to indicate information about the contacts. For example, some of the contact images 19 in FIG. 1, including contact images 19B, are highlighted or indicated in bold. This may represent, for example, that those contacts are currently available to communicate with. For example, it may indicate that those people currently have their cellphones on, or that those people currently have an "available" status selected on their cellphones, or that those people are currently logged on and active with an instant messenger account, for example.

Communication device 10 therefore provides an intuitive and natural interface for users of any level of technical inclination to call, email, message, text, or otherwise contact someone, since all the user does, in this illustrative example, is touch an image of the person they want to call, email, message, text, or otherwise contact.

In the case of a phone call, the user's voice may be picked up by microphone 15, while in the case of an email, instant message, or text message, the user may enter text and/or numbers with any of a variety of text input mechanisms, such as a keyboard, a keypad, a graphics tablet, a stylus, or a numberpad, for example. The microphone, keyboard, and so forth thereby may all serve as different types of language input mechanism, to pick up the user's spoken or written words and to send them over the appropriate communication channel. A keyboard or keypad may be incorporated with virtual keys on monitor 11, or with hard keys on a separate component of communication device 10, in different embodiments. A graphics tablet for use with a stylus may also be incorporated on a separate component of communication device 10, or a stylus may be used with a touchscreen mechanism in direct association with monitor 11, while a touchscreen mechanism may also be designed particularly for direct human touch, in different embodiments.

The language input mechanism may thereby be different than the graphical position user input mechanism, such as a touchscreen associated with monitor 11. The selected communication channel is associated with the type of contact information element, so that selection of an image that is associated with a telephone number triggers opening a communication channel in the form of a phone call, selection of an image associated with an email address triggers the opening of an email composition panel addressed to the selected email address to prepare for sending through the communication channel of email, and so forth. An individual one of thumbnail images 13 may also be associated with multiple contact information elements, as described below with reference to FIG. 4.

A phone call, instant message, or other communication channel may also include or be combined with video. In this case, camera 13 may record images of the user and transmit them over the communication channel together with the language input, while the other party to the phone call, instant message, or other communication channel may also have a camera that records images of that person, which are displayed on monitor 11. Communication device 10 may also include other features for optimizing a videoconference or video messaging experience, such as the ability for the user to select and zoom in on a section of an image being displayed on monitor 10 based on a video feed from a recipient contact's video feed. The contact images, and potentially a video feed between communication device 10 and a contact's device, may also serve as a graphical front end interface for other applications or input mechanisms, such as mutual access to text-related applications, such as a shared whiteboard or mutually editable documents, for example.

While FIG. 1 depicts category icons 17 used to sort contact people by category, in other embodiments, the contact images may be sorted in other modes. For example, they may be sorted in alphabetical order of the names associated with the images, or by the frequency with which the user selects them for initiating contact with the people associated with them, so that an initial display may include a section with a short, ranked list of the most frequent contacts. Sorting of the contact initiation images may also be done in conjunction with other navigation and selection mechanisms, such as voice user interface: for example, communication device 10 may be configured to refine the images presented in response to a voice input. For instance, communication device 10 may be configured so that if a user has the device in an image navigation mode and the user voices the name, "John", communication device 10 may then prominently display the images for all the contacts with contact information elements stored on the device where the contacts have the first name of "John". Any other method of navigation among the contact initiation images may also be used in other embodiments.

Figure 2:
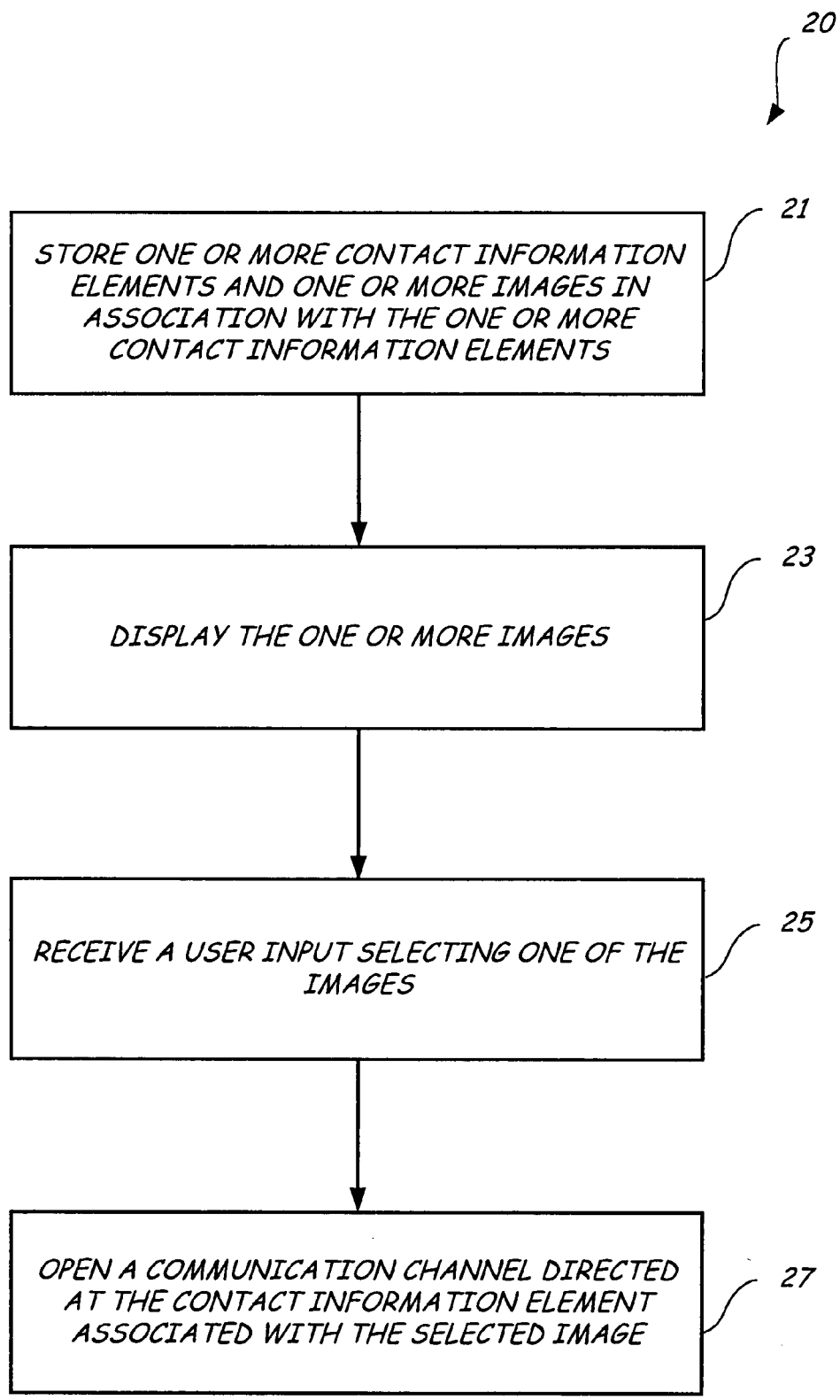
FIG. 2 depicts a flowchart for a method performed by a graphical communication user interface, according to an illustrative embodiment.

FIG. 2 depicts a flowchart for a method 20 performed by a graphical communication user interface, such as that described above with reference to FIG. 1, as well as further examples described below, according to various illustrative embodiments. Method 20 includes step 21, of storing one or more contact information elements and one or more images in association with the one or more contact information elements. Method 20 further includes step 23, of displaying the one or more images, and step 25, of receiving a user input selecting one of the images. Method 20 also includes step 27, of opening a communication channel directed at the contact information element associated with the selected image.

Figure 3:
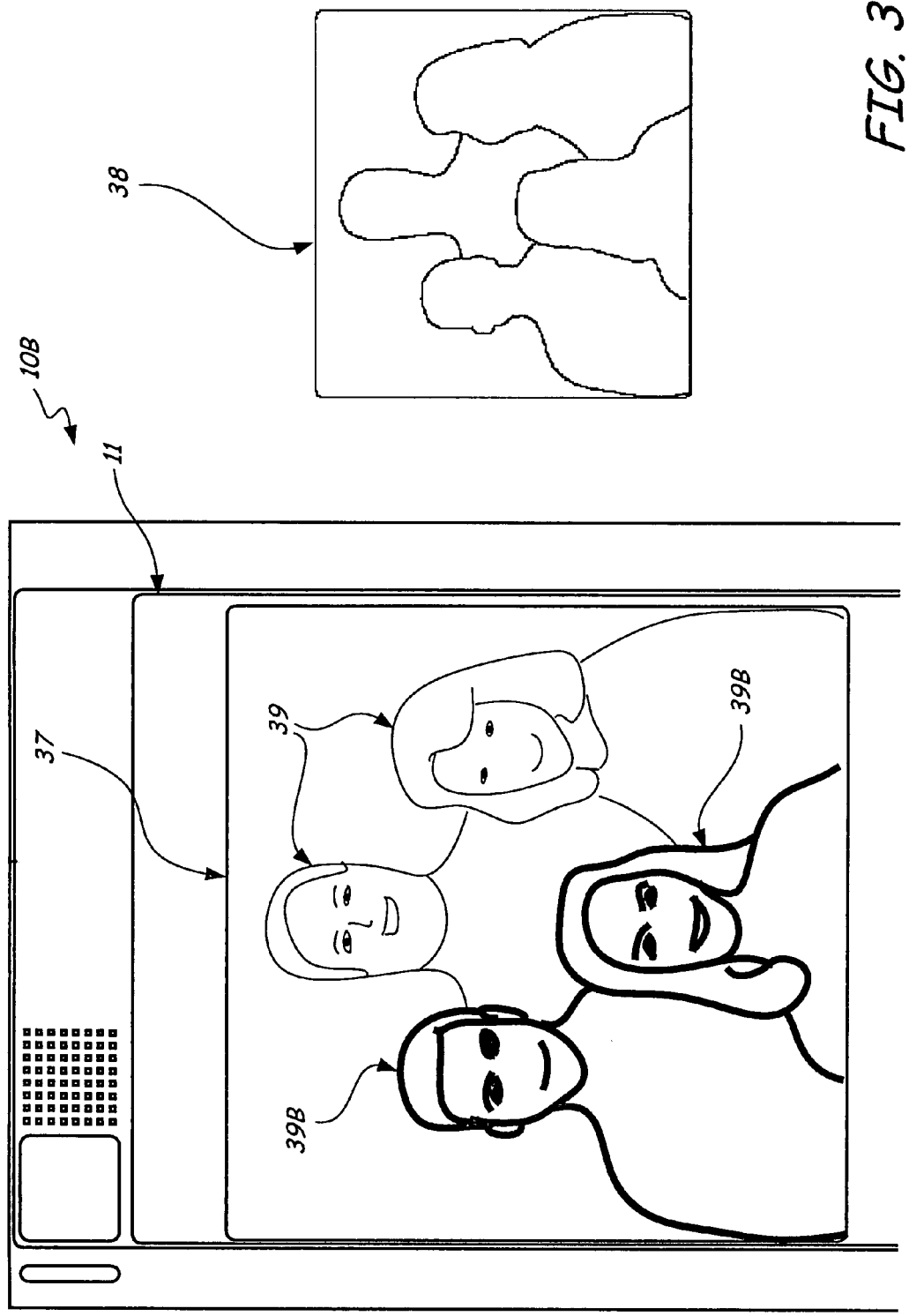
FIG. 3 depicts a device comprising a graphical communication user interface in an illustrative context of usage, according to an illustrative embodiment.

FIG. 3 depicts the same communication device 10 in a different mode of displaying contact images, indicated as 10B, where multiple contacts are depicted within image portions 39 within a single image 37. The single image 37 may be a single photograph that was taken, and the individual contact people in it were later identified and mapped to a corresponding coordinate frame 38 stored in the communication device's memory in connection with image 37, with portions of the coordinate frame mapped to the image portions 39 that depicted individual contact people. The mapping of image portions to sections of the coordinate frame and association of those coordinate frame sections to a particular stored user and that user's contact information elements, may be performed automatically such as by using a pattern recognition mechanism, or may be done manually by a user, for example. Such use of pattern recognition is described further below. A user may then touch a particular image portion 39 for a particular contact person, and the touchscreen mechanism or other graphical user input mechanism may receive the selection of one of the mapped portions of coordinate frame 38, and open a communication channel with the contact information element stored for that contact.

As in FIG. 1, image 37 may also indicate different image portions 39 depicting different contact people in different modes, depending on changing aspects of status related to those contact people. For example, image 37 depicts certain of the image portions 39B to be highlighted, to represent that the corresponding contact people are currently available, such as by having their cellphones on or their instant messenger accounts logged into, for example. Many other modes of indicating aspects of status for contacts may also be used, such as depicting currently available contacts in full color, and currently unavailable contacts in black and white, or depicting available contacts with a flashing boundary, for example. These status indications may be passively communicated from the contact people's communication or computing devices to communication device 10, assuming that the contact person has their device on a setting that allows such information to be shared with the communication device 10.

Figure 4:
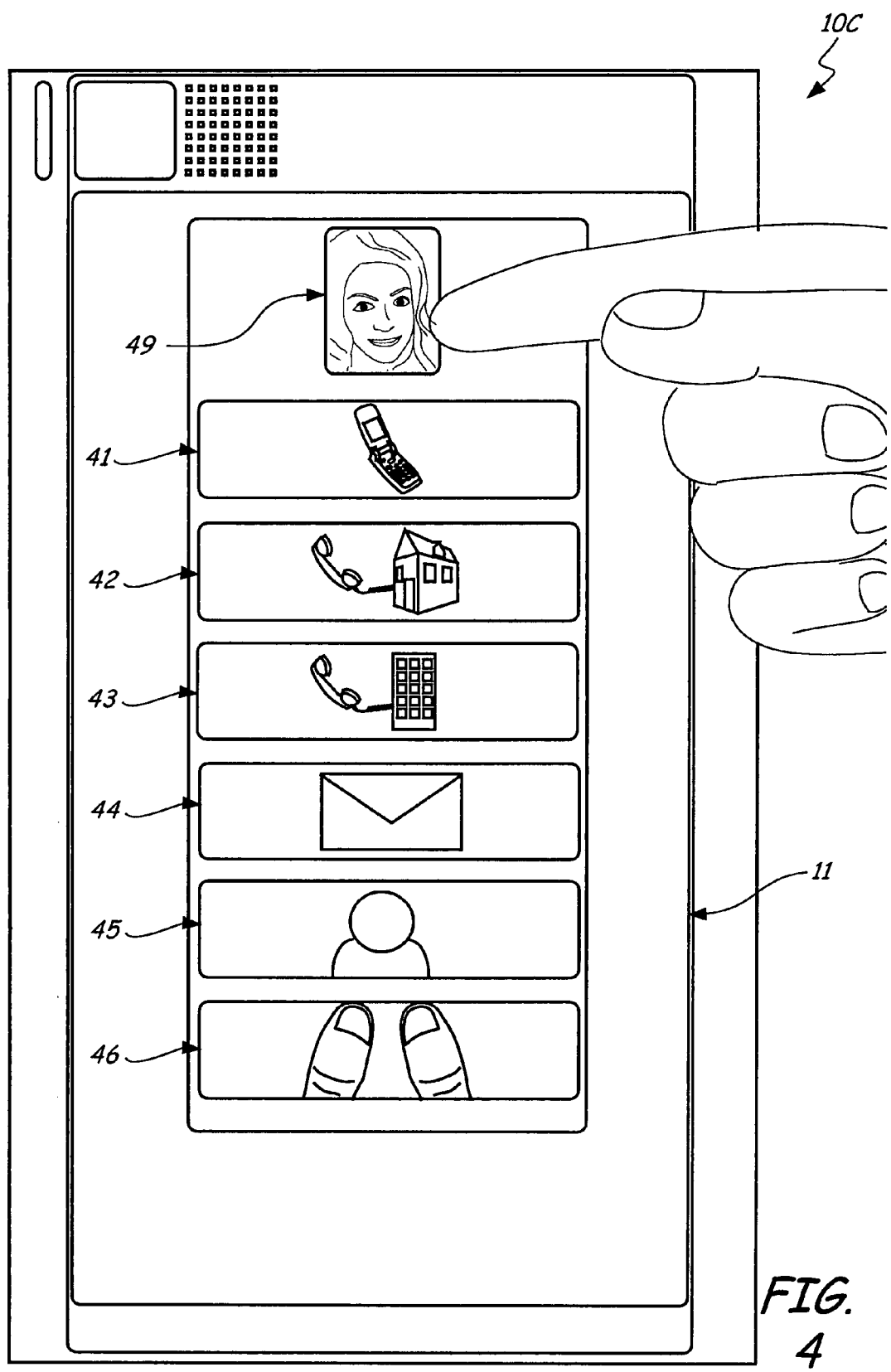
FIG. 4 depicts a device comprising a graphical communication user interface in an illustrative context of usage, according to an illustrative embodiment.

After the communication device 10 identifies through the touchscreen that a user has selected the coordinate area corresponding to the position of a particular image corresponding to a particular contact, it may proceed directly to open a communication channel with a contact information element associated with the image, such as by dialing a cellphone number by default, for example. In another configuration, communication device 10 may have a preferred communication channel and a preferred communication contact information element pre-selected for one of the contacts if the user has previously selected a preference, for images associated with multiple contact information elements. If multiple contact information elements are stored in association with the selected thumbnail image, and no default communication channel is in place or if no preference has been recorded for one of them to activate as a default, then communication device 10 may present a new display with a set of contact channel options, instead of going straight to a phone call or other communication channel when an image is touched. The communication channel option display is shown in FIG. 4.

If a contact image is selected with an indication that the user wants to select from among multiple contact channels, or if communication device 10 is configured without a set default communication channel and the image selected is associated with contact information elements for more than one communication channel, communication device 10 may then display multiple communication channel options on monitor 11. FIG. 4 depicts communication device 10 in an aspect 10C in which it displays multiple selectable options for communication channels for contacting a single contact person. In this illustrative embodiment, communication device 10 again includes a touchscreen mechanism associated with monitor 11. In the configuration depicted, the user has touched one of the contact images 19 as depicted in FIG. 1, now appearing as lone contact image 49, and indicated for multiple communication channel options to be presented, such as by holding her finger down on the selected image or pressing a multiple channel button, for example. Communication device 10 now displays multiple graphic icons, one for each of a variety of potential communication channels. Communication device 10 displays a communication channel icon for each communication channel for which it has stored a contact information element associated with the selected contact person, depicted in contact image 49.

For example, in the case of the contact person associated with contact image 49, communication device 10 has a cellphone number, a home landline phone number, an office landline phone number, an email address, an instant messenger username, and a text message number, stored in association with the selected contact person. Communication device 10 therefore displays a different communication channel icon for each of these communication channels. These include communication channel icon 41, for calling the contact's cellphone; communication channel icon 42, for calling the contact's home landline phone; communication channel icon 43, for calling the contact's office landline phone; communication channel icon 44, for composing an email addressed to the contact; communication channel icon 45, for sending the contact's username an instant message; and communication channel icon 46, for sending a text message to the contact.

Other modes of displaying the different communication channel options are also possible in other configurations, such as text indications, for example. Any other icons or other graphical indicators may also be used for each of the communication channel options, in other settings. Any other type of communication channel may also be used, and may have associated contact information elements and associated communication channel icons. After the user selects one of the contact information element widgets, the communication device 10 opens the appropriate communication channel. For example, this may be a telephone call, accompanied by a two-way video feed, which is depicted in FIG. 5.

Figure 5:
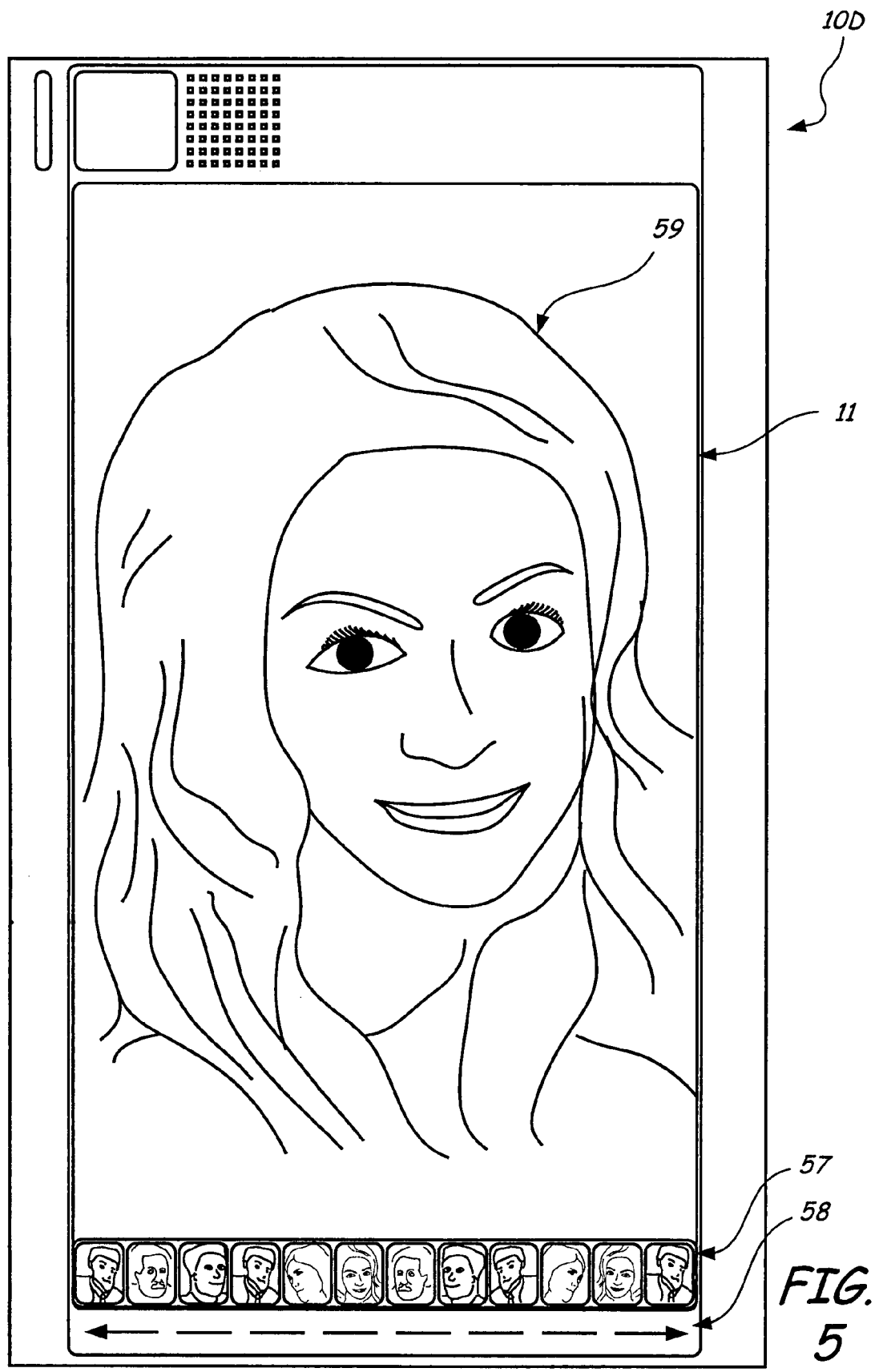
FIG. 5 depicts a device comprising a graphical communication user interface in an illustrative context of usage, according to an illustrative embodiment.

FIG. 5 depicts communication device 10 in another aspect 10D, with most of monitor 11 showing an image feed 59 of the recipient previously selected to initiate a phone call with. Communication device 10 may also display an associated still image of the contact person, or display something else on monitor 11, if the contact person does not have a video feed selected or available. Part of the monitor 11 also still depicts multiple thumbnail images 57 of other people for whom associated contact information elements are stored. One of thumbnail images 57 may still be selected from within the display of monitor 11, which may be done to initiate contact with another recipient, either subsequent to the phone call with the recipient depicted in the main display of monitor 11 or as a third party to the communication channel with the recipient pictured in monitor 11. A portion of monitor 11 is also used to display navigation elements 59, which may be used to scroll the row of thumbnail images 57 left or right, to access additional thumbnail images stored on communication device 10.

The images stored on communication device 10, to represent contacts and to be associated with contact information elements for those contacts, may be derived in a number of ways. The user may load the images from a pre-stored source, or by recording an image with the camera 15 and associating the recorded image with a contact information element, which itself may be either uploaded from a pre-stored source, or entered by the user. Alternatively, a contact individual may send an image to communication device 10, such as by a virtual business card, as an attachment to an email or instant message, or as an avatar that is automatically sent in an instant message panel, for example.

An uploaded image, such as from a virtual business card or from an automatic avatar used by an instant messaging client, may have metadata associated with it, that may contain the name of the person depicted in the image, along with one or more contact information elements for that person. This information may be recorded from the metadata to automatically associate with the image, in an illustrative embodiment. Alternately, a user may select an image to associate with a contact information element that is stored on the communication device 10, such as by selecting options for a standard avatar, or by selecting an arbitrary image to associate with the contact, for example. Additional images may also be received or generated and be also associated with a contact information element or name that is already stored on communication device 10, whether or not that contact information element or name already has one or more images already stored in association with it. Communication device 10 may then use any one or more of a collection of images associated with a single contact, and may offer the chance to switch from one of the images for that contact to another, at different times, in this illustrative embodiment.

In another illustrative embodiment, a newly uploaded or received image may be associated with an existing one or more images through a pattern recognition mechanism. For example, a pattern recognition mechanism may include a machine learning classifier that is configured to perform face recognition, where the classifier may be embodied in software that runs on the communication device 10. Different components of the machine learning classifier may also be embodied as hardware elements on communication device 10, and/or may be stored on other resources that are accessible to communication device 10. If one or more images of a particular contact are already stored on communication device 10, and a new image of the same contact is received by communication device 10, communication device 10 may run the machine learning face recognition classifier to automatically determine that the subject depicted in the new image correlates with, or has similar characteristics with, a subject already depicted in other images already stored on communication device 10. Communication device 10 may then associate the new image also with the previous images of the same contact along with association with that contact's contact information elements. Communication device 10 may then subsequently use the new image to display on the monitor and have it serve as a trigger, if selected, to open a communication channel according to the previously stored contact information element.

Such face recognition mechanisms may also be used for identifying a particular contact within an image that includes depictions of several different people, and mapping the coordinates of the portion of the image that coincides with the depiction of that particular contact person, as in FIG. 3. Face recognition mechanisms may also be used actively with images of the user of communication device 10 captured by the camera 13, and used for a user login or security mechanism, in an illustrative embodiment. A device with multiple user accounts may detect a new user accessing the device, apply a face recognition mechanism to images of the new user being recorded by camera 13, compare the parameters of the user's face as generated by the face recognition mechanism with previously stored face recognition parameters associated with different user accounts, and automatically log into the user account that matches the parameters, or prevent any user account from being accessed if the parameters do not correspond to any user account. The device may then default to a password login mode in an illustrative embodiment, for example.

Communication device 10 may also include various functions as a media playback device, for rendering still images, videos files, and audio files, and may therefore also provide a seamless transition for sharing such media files with contact recipients. A user may select a media file to send through a communication channel along with a phone call, email, or instant message, for example. Still image and video media files that are shared from one user to another may in turn be used to clip images from the media files to associate with a contact information element, and to serve as a new graphical icon for initiating a communication channel directed toward the associated contact information element. These are just illustrative examples, and there are many other additional ways in which communication device 10 may serve as a united platform for both a full spectrum of communication modes with recipient contacts and a full spectrum of media access.

As another advantage for people of any level of technical interest, because the form factor of communication device 10 is dominated by monitor 11 and is designed with a minimal aesthetic, in this illustrative embodiment, it may be set to display any image, which dominates its appearance, when not in use. Communication device 10 may therefore also, when not in active use, display a personally selected wallpaper image, or a revolving set of personally selected images, or a screensaver, or some other option for presenting an aesthetic appearance. Communication device 10 may therefore be made to blend in and complement a user's surroundings, rather than presenting an overtly "techy" or "gadgety" appearance, in this illustrative embodiment, and may therefore hold a more aesthetic appeal among a broad variety of different users.

The capabilities and methods for the illustrative graphical communication user interface systems, devices, and methods described and depicted herein may be embodied or associated with a wide variety of hardware and computing environment elements and systems. A computer-readable medium may include computer-executable instructions that configure a computer to run applications, perform methods, and provide systems associated with different embodiments. For example, executable instructions may be stored on a communication/computing device which, when executed by a processor also included in the device, configure the device to display images on the monitor based on image files stored on the device, to receive a user input via a graphical input mechanism indicating one of the images, to open a communication channel via a communication interface based on the contact information element associated with the selected image, to receive input via a language input mechanism, and to convey the input via the communication channel. Some illustrative features of exemplary embodiments such as are described above may be executed on computing devices such as computer 110 or mobile computing device 201, illustrative examples of which are depicted in FIGS. 6 and 7.

Figure 6:
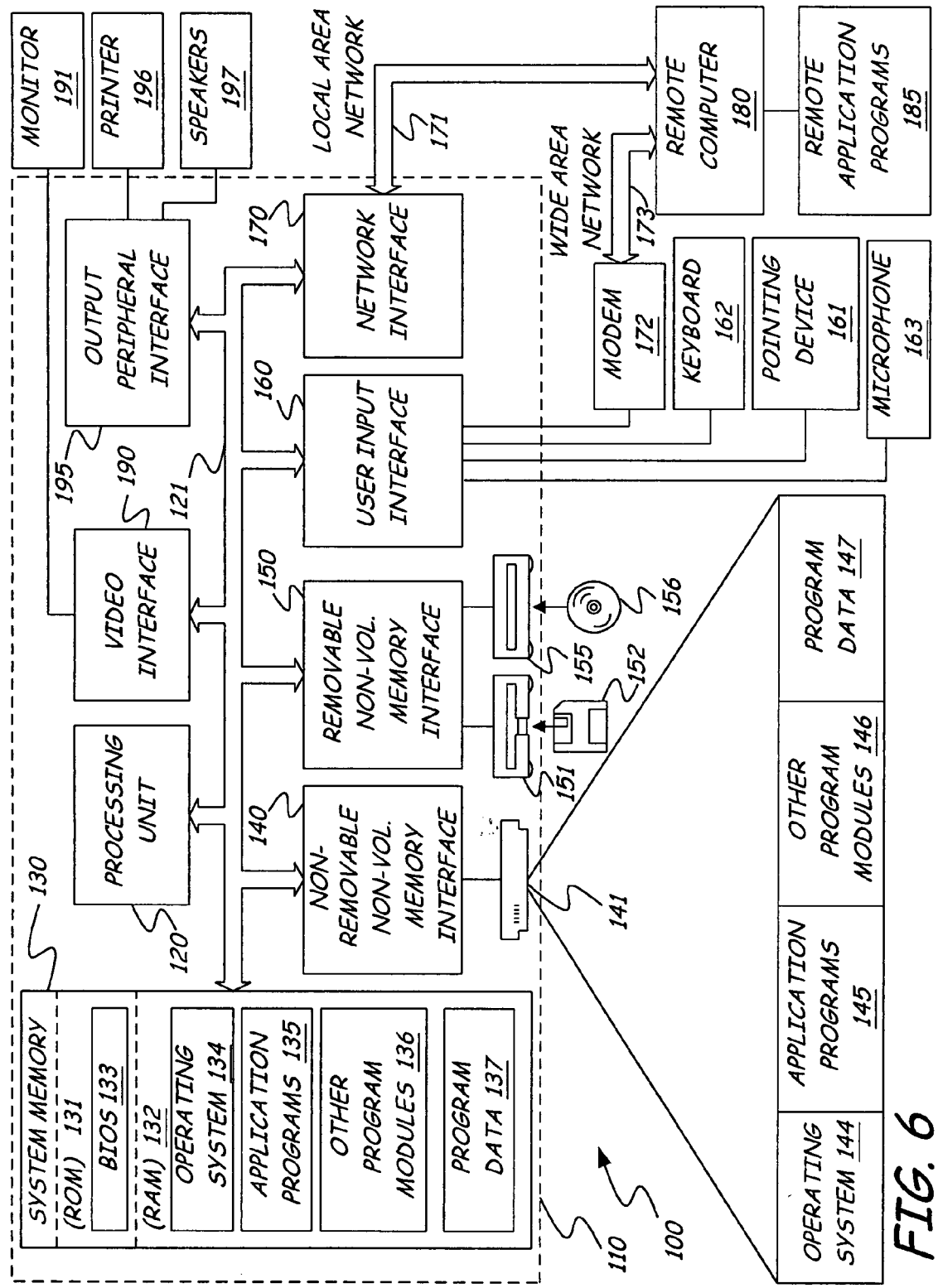
FIG. 6 depicts a block diagram of a graphical communication user interface in an illustrative context of a computing environment, according to an illustrative embodiment.
Figure 7:
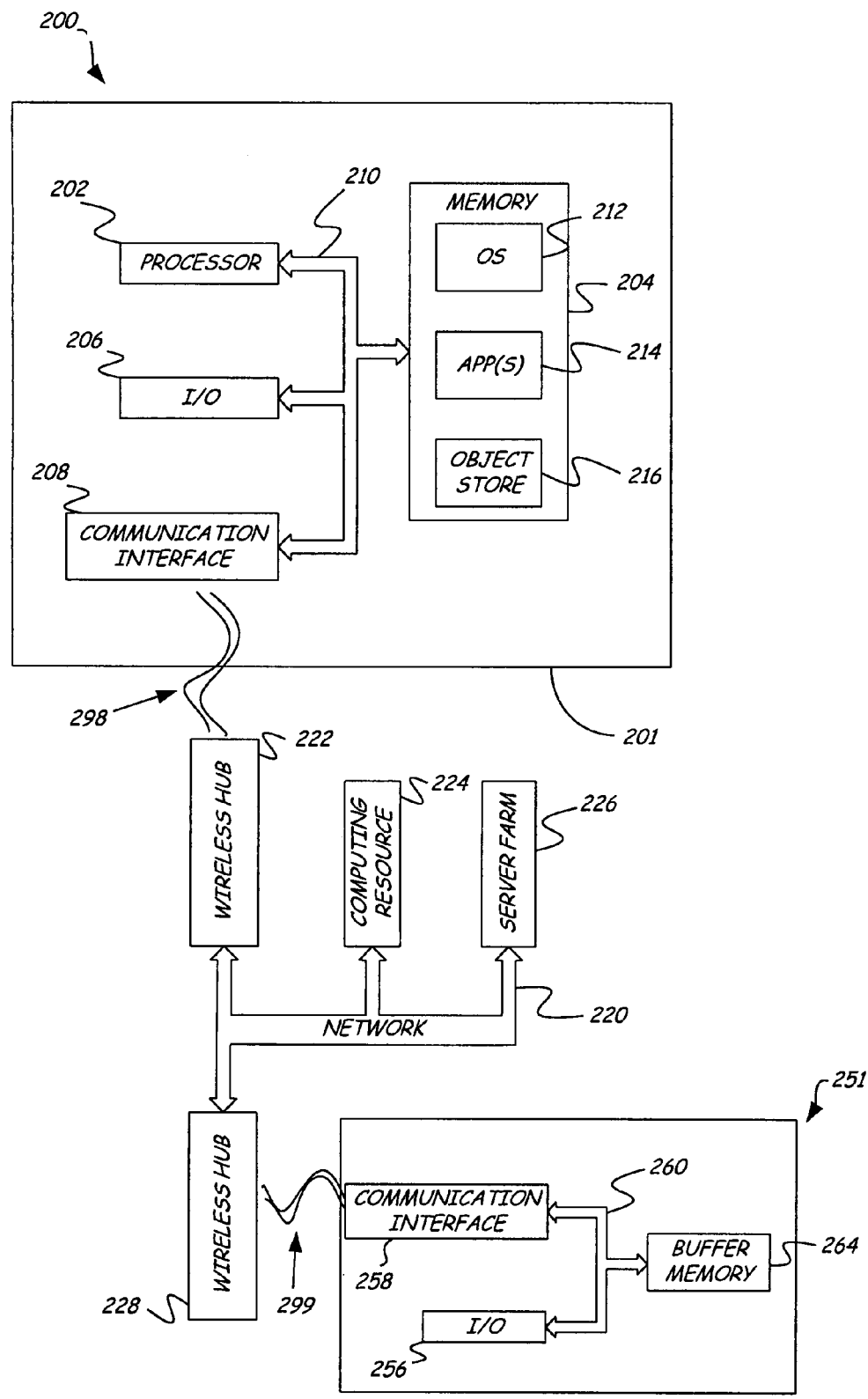
FIG. 7 depicts a block diagram of a graphical communication user interface in an illustrative context of a general mobile computing environment, according to an illustrative embodiment.

FIG. 6 illustrates an example of a suitable computing system environment 100 with which various embodiments may be implemented. Computing system environment 100 as depicted in FIG. 6 is only one example of a suitable computing environment for functioning cooperatively with various embodiments, and is not intended to suggest any limitation as to the scope of use or functionality of the claimed subject matter. Neither should the computing environment 100 be interpreted as having any dependency or requirement relating to any one or combination of components illustrated in the exemplary operating environment 100.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices. As described herein, such executable instructions may be stored on a medium such that they are capable of being read and executed by one or more components of a computing system, thereby configuring the computing system with new capabilities.

With reference to FIG. 6, an exemplary system for implementing some embodiments includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 6 illustrates operating system 134, application programs 135, other program modules 136, and program data 137.

The computer 110 may also include other removable/non-removable volatile/nonvolatile computer storage media. By way of example only, FIG. 6 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 6, provide storage of computer readable instructions, data structures, program modules and other data for the computer 110. In FIG. 6, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 6 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 6 illustrates remote application programs 185 as residing on remote computer 180. It will be appreciated that the network connections shown are exemplary and other means of establishing a communications link between the computers may be used.

FIG. 7 depicts a block diagram of a general mobile computing environment, comprising a mobile computing device and a medium, readable by the mobile computing device and comprising executable instructions that are executable by the mobile computing device, according to another illustrative embodiment. FIG. 7 depicts a block diagram of a mobile computing system 200 including mobile device 201, according to an illustrative embodiment. Mobile device 201 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is illustratively allocated as addressable memory for program execution, while another portion of memory 204 is illustratively used for storage, such as to simulate storage on a disk drive.

Memory 204 includes an operating system 212, application programs 214 as well as an object store 216. During operation, operating system 212 is illustratively executed by processor 202 from memory 204. Operating system 212, in one illustrative embodiment, is a WINDOWS® CE brand operating system commercially available from Microsoft Corporation. Operating system 212 is illustratively designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200.

Mobile computing system 200 also includes network 220. Mobile computing device 201 is illustratively in wireless communication with network 220—which may be the Internet, a wide area network, or a local area network, for example—by sending and receiving electromagnetic signals 298 of a suitable protocol between communication interface 208 and wireless interface 222. Wireless interface 222 may be a wireless hub or cellular antenna, for example, or any other signal interface. Wireless interface 222 in turn provides access via network 220 to a wide array of additional computing resources, illustratively represented by computing resources 224 and server farm 226. Naturally, any number of computing devices in any locations may be in communicative connection with network 220. Computing device 201 is enabled to make use of executable instructions stored on the media of memory component 204, such as executable instructions that enable computing device 201 to receive a graphical user interface input selecting an image and opening a communication channel with a contact information element associated with the image, and other tasks, according to various illustrative embodiments.

FIG. 7 also depicts another illustrative embodiment, in the form of a computing environment that includes a communication device 251 with only some of the components depicted for mobile computing system 200, such as input/output mechanisms 256, buffer memory 264, and a communication interface 258, interconnected on an internal bus 260, but may serve as a client device that depends on remote computing resources, such as one or more network-connected computing resources 224 and network-connected server farms 226, which may collectively be referred to as "the Cloud", to handle processing and run applications. Communication device 251 may illustratively be in communicative connection with network 220 through wireless signals 299 between communication interface 260 and wireless hub 228, or may be connected through a wired connection, or a scaled area network such as large area network (LAN) or wide area network (WAN) or personal area network (PAN), for example, or by any other means of communicative connection.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. As a particular example, while the terms "computer", "computing device", or "computing system" may herein sometimes be used alone for convenience, it is well understood that each of these could refer to any computing device, computing system, computing environment, mobile device, or other information processing component or context, and is not limited to any individual interpretation. As another particular example, while many embodiments are presented with illustrative elements that are widely familiar at the time of filing the patent application, it is envisioned that many new innovations in computing technology will affect elements of different embodiments, in such aspects as user interfaces, user input methods, computing environments, and computing methods, and that the elements defined by the claims may be embodied according to these and other innovative advances while still remaining consistent with and encompassed by the elements defined by the claims herein.

What is claimed is:

1. A device comprising:
   a processor;
   a monitor;
   a user input mechanism; and
   executable instructions stored on the device, which, when executed by the processor, configure the device to:
   obtain a single image comprising a pictorial representation of a plurality of potential communication recipients, the single image having a plurality of image portions each representing a different one of the plurality of potential communication recipients;

apply a pattern recognition mechanism to the single image to match each of the plurality of image portions to one or more image files, each image file being associated with a contact information element identifying a communication channel to a potential communication recipient;

store information, based on application of the pattern recognition mechanism, that identifies an association of each image portion with a contact information element for the potential communication recipient represented by the image portion, wherein the single image is associated with at least two different contact information elements;

identify status information related to communication availability with at least one of the potential communication recipients represented by the plurality of image portions;

display the single image, after applying the pattern recognition mechanism, for user selection at a display location on the monitor, wherein at least one of the image portions is visually modified based on the status information;

receive a user input that selects one of the image portions and identify the contact information element associated with the selected image portion; and open the communication channel identified by the contact information element associated with the selected image portion.

2. The device of claim 1, further comprising a language input mechanism, and further configured to receive language user inputs via the language input mechanism and to send the language user inputs via the communication channel.

3. The device of claim 2, wherein the language user input mechanism comprises at least one of: a microphone, a keyboard, a keypad, a graphics tablet, a stylus, or a numberpad.

4. The device of claim 1, wherein the user input mechanism comprises at least one of: a touch-screen input associated with the monitor and a pointing device.

5. The device of claim 4, wherein the user input mechanism includes a pointing device, comprising at least one of: a mouse, a touchpad, a pointing stick, a graphics tablet, a stylus, a trackball, a joystick, or a light pen.

6. The device of claim 1, further comprising a camera configured to record images and to transmit the captured images via the communication channel.

7. The device of claim 1, wherein the status information indicates that a first one of the potential communication recipients represented by a first one of the image portions is considered available for communication.

8. The device of claim 7, wherein visually modifying at least one of the images portions comprises visually modifying the first image portion so as to distinguish the first potential communicate recipient from a second potential communication recipient that is not considered available for communication.

9. The device of claim 8, wherein the first image portion is visually modified to highlight the first potential communication recipient.

10. A method comprising:
storing a plurality of image files, each associated with at least one contact information element identifying a communication channel to a potential communication recipient;

receiving a single image comprising a pictorial representation of a plurality of potential communication recipients, the single image having a plurality of image portions with each image portion visually representing a different one of the plurality of potential communication recipients;

applying a pattern recognition mechanism to the single image to match each of the plurality of image portions to one or more of the image files and correlate the single image with one or more contact information elements associated with the image files, wherein the single image is associated with at least two different contact information elements;

identify status information related to communication availability with at least one of the potential communication recipients represented by the plurality of image portions;

after applying the pattern recognition mechanism, displaying the single image for user selection, wherein at least one of the image portions is visually modified based on the status information;

receiving a user input selecting one of the plurality of image portions of the single image; and opening the communication channel identified by the contact information element associated with the selected image portion.

11. The method of claim 10, wherein the contact information element is selected from among a phone number, an email address, an instant messaging username, or a text message number; and wherein the communication channel comprises a telephone call, an email, an instant messaging panel, or a text message.

12. The method of claim 10, further comprising storing one or more names in association with one or more images.

13. The method of claim 10, further comprising applying a pattern recognition mechanism to an additional image, and matching at least a portion of the additional image to one or more of the stored images based on the pattern recognition mechanism to correlate the additional image with one or more of the stored contact information elements.

14. The method of claim 10, further comprising recording an image with a camera, applying a face recognition mechanism to the image, and comparing a result of the face recognition mechanism with stored face recognition information associated with one or more user accounts, wherein displaying the one or more images comprises displaying one or more images associated with a user account indicated by the result of the face recognition mechanism.

15. The method of claim 10, further comprising:
storing information that associates the image with a plurality of contact information elements that identify a plurality of communication channels to the potential communication recipient;

responding to a user input selecting the image by offering, based on the stored information, selectable options for the plurality of contact information elements associated with the image; and responding to a user input selecting one of the plurality of contact information elements by opening the communication channel identified by the selected contact information element.

16. The method of claim 10, further comprising recording a new contact information element, and associating a selected image with the new contact information element, wherein the selected image comprises either an image received via the communication channel, an image recorded with a camera, an image that is input by a user, an image that is selected by a user, or an image that is generated in association with the new contact information element.

17. A device comprising:
a processor;
a communication interface, communicatively connected to the processor;
a language input mechanism, communicatively connected to the processor;
a monitor, communicatively connected to the processor;
an input mechanism; and
one or more media, communicatively connected to the processor and readable by the processor, wherein the one or more media comprises:
an image file comprising a single image having a pictorial representation of a plurality of potential communication recipients, the single image having a plurality of image portions each representing a different one of the plurality of potential communication recipients; and
executable instructions, which, when executed by the processor, configure the device:
to identify status information related to communication availability with at least one of the potential communication recipients represented by the plurality of image portions,
to apply a pattern recognition mechanism to the single image to match each of the plurality of image portions to one or more image files, each image file being associated with a contact information element identifying a communication channel to a potential communication recipient;
to store information, based on application of the pattern recognition mechanism, that identifies an association of each image portion with a contact information element for the potential communication recipient represented by the image portion, wherein the single image is associated with at least two different contact information elements,
to display the single image, after applying the pattern recognition mechanism, wherein at least one of the image portions is visually modified based on the status information,
to receive a user input via the input mechanism selecting one of the plurality of image portions of the single image,
to open a communication channel via the communication interface based on the contact information element associated with the selected image portion of the single image,
to receive input via the language input mechanism, and
to convey the input to the communication recipient represented by the selected image portion of the single image via the communication channel.

18. The device of claim 17, wherein the single image comprises a single photograph or picture.

* * * * *